United States Patent [19]
Bowen

[11] Patent Number: 6,052,606
[45] Date of Patent: Apr. 18, 2000

[54] REVERSIBLE KEYPAD AND DISPLAY FOR A TELEPHONE HANDSET

[75] Inventor: Ronald A. Bowen, Sterling, Va.

[73] Assignee: Lockheed Martin Corporation, Bethesda, Md.

[21] Appl. No.: 08/989,463

[22] Filed: Dec. 12, 1997

[51] Int. Cl.$^7$ .............................. H01S 4/00; H04B 1/38; G09G 5/00
[52] U.S. Cl. ........................ 455/566; 455/90; 455/550; 455/575; 345/173; 345/172
[58] Field of Search ............... 455/575, 90, 550, 455/566; 345/173, 172; 708/140, 142, 145

[56] References Cited

U.S. PATENT DOCUMENTS

| | | |
|---|---|---|
| 4,268,721 | 5/1981 | Nielson et al. . |
| 5,335,276 | 8/1994 | Thompson et al. . |
| 5,422,656 | 6/1995 | Allard et al. . |
| 5,465,401 | 11/1995 | Thompson . |
| 5,537,608 | 7/1996 | Beatty et al. . |
| 5,568,536 | 10/1996 | Tiller et al. . |
| 5,572,573 | 11/1996 | Sylvan et al. ............................. 379/61 |
| 5,581,243 | 12/1996 | Quellette et al. ....................... 345/173 |
| 5,584,054 | 12/1996 | Tyneski et al. . |
| 5,615,384 | 3/1997 | Allard et al. . |
| 5,633,912 | 5/1997 | Tsoi . |
| 5,808,862 | 9/1998 | Robbins ................................... 361/681 |

*Primary Examiner*—Wellington Chin
*Assistant Examiner*—Sheila Smith
*Attorney, Agent, or Firm*—Lane, Aitken & McCann

[57] ABSTRACT

In cellular telephone handset having an upper casing and a lower casing, liquid crystal display screens with touch sensitive overlays are provided on each casing. In one mode of operation, the screen on the lower casing will display a telephone keypad and the telephone handset will respond to the touching of the keys from the telephone keypad to dial telephone numbers and will display information on the screen on the upper casing. In a second mode of operation, the screen on the upper casing will display function keys and the telephone handset will respond to the touching of the function keys and will display information on the screen on the lower casing.

8 Claims, 5 Drawing Sheets

REVERSIBLE KEYPAD AND DISPLAY FOR A TELEPHONE HANDSET

This invention relates to cellular telephone handsets and, more particularly, to a cellular telephone handset provided with an improved display and key pad system.

BACKGROUND OF THE INVENTION

A typical cellular telephone handset has a small display screen for viewing information and a keypad for entering data, such as a telephone number to be called, and to control and select functions to be performed by the handset. Many telephone handsets are designed to receive paging messages, store information in memory, recall information from the memory, and display it on the display screen of the handset, as well as provide for voice telephone communications. Modern telephone handsets have become very small and, as a result, the display screen on such handsets are, accordingly, quite small. As a result, the amount of information that can be displayed in a given instant of time is limited. The small display screens are quite adequate for normal telephone operations, but when the display screen operates to display a received message such as sent with a page or an E-mail message, the size of the screen becomes a handicap because it is inadequate to display enough information at one time. Similarly, the size of the screen becomes a disadvantage when the handset is operated to display maps, pictures or X-ray photographs.

In prior art systems, it has been proposed to implement the keypad for the telephone handset in the form of a touch tone screen and use the touch tone screen thus provided also as a display screen. Such arrangement, however, is somewhat awkward to use because there is still need for key inputs to control the operation of the handset when it is operated in a display mode.

The present invention provides an improved solution to the problem in that it provides two screens, one which would normally function in telephone dialing operations as a display screen and the second screen will implement the keypad in a touch sensitive mode for the telephone dialing operations. The small display screen will be used in telephone dialing operations to display information related to telephone dialing, such as displaying the number to be called. In accordance with the invention, when the handset is being used to display larger amounts of data, the roles of the two screens are reversed. The small screen then becomes a touch sensitive keypad implementing a small number of keys to control the function of the device and the larger screen, which formerly implemented a telephone keypad, then serves the function of displaying information. In this manner, the entire larger screen used to implement the telephone keypad becomes available to display information and enables a larger amount of information to be displayed simultaneously on the screen.

DESCRIPTION OF A PREFERRED EMBODIMENT

Figure 1:
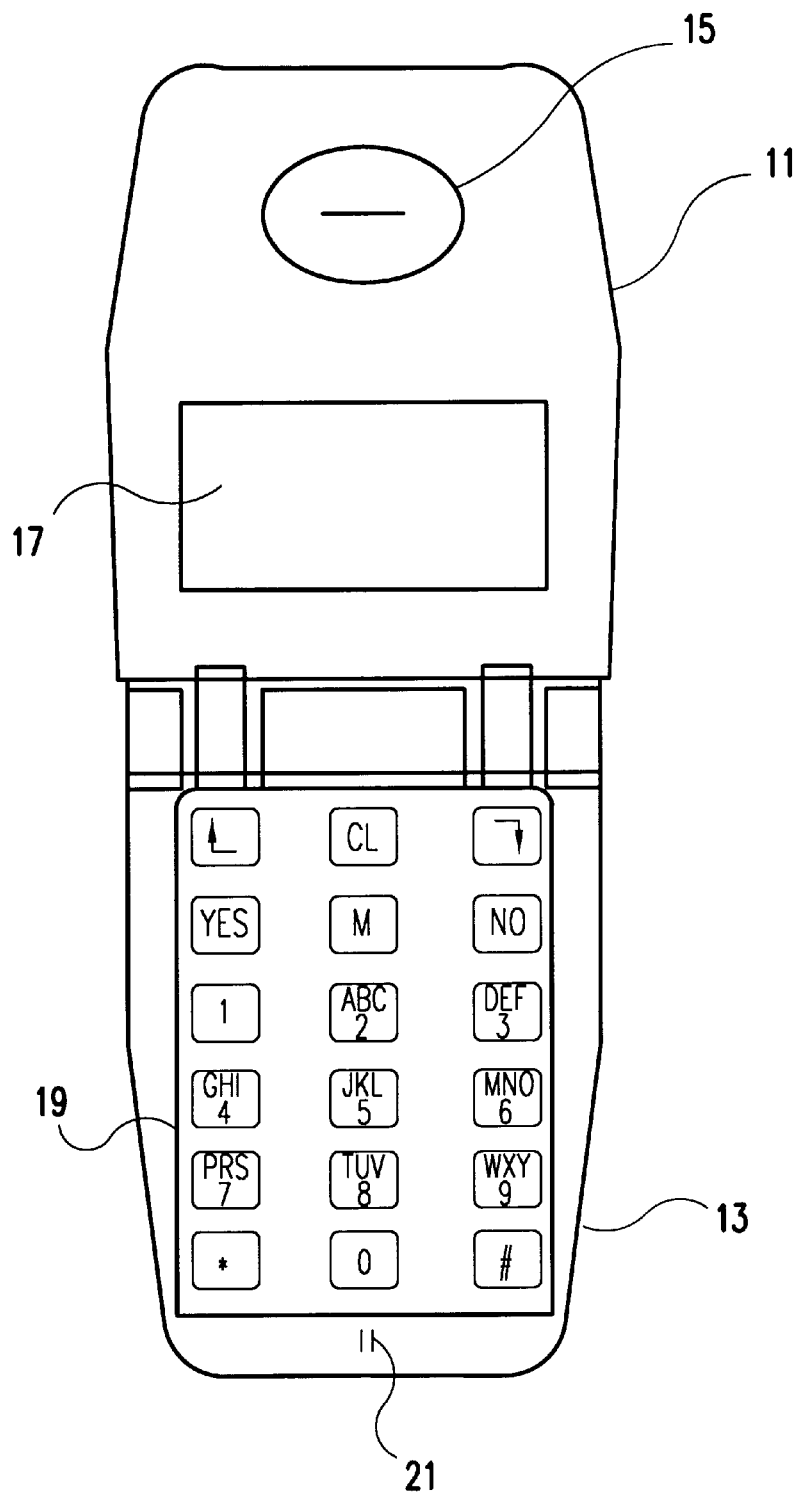
FIG. 1 illustrates a view in elevation of the functional side of the telephone handset of the invention when operating in a normal telephone dialing mode.
Figure 2:
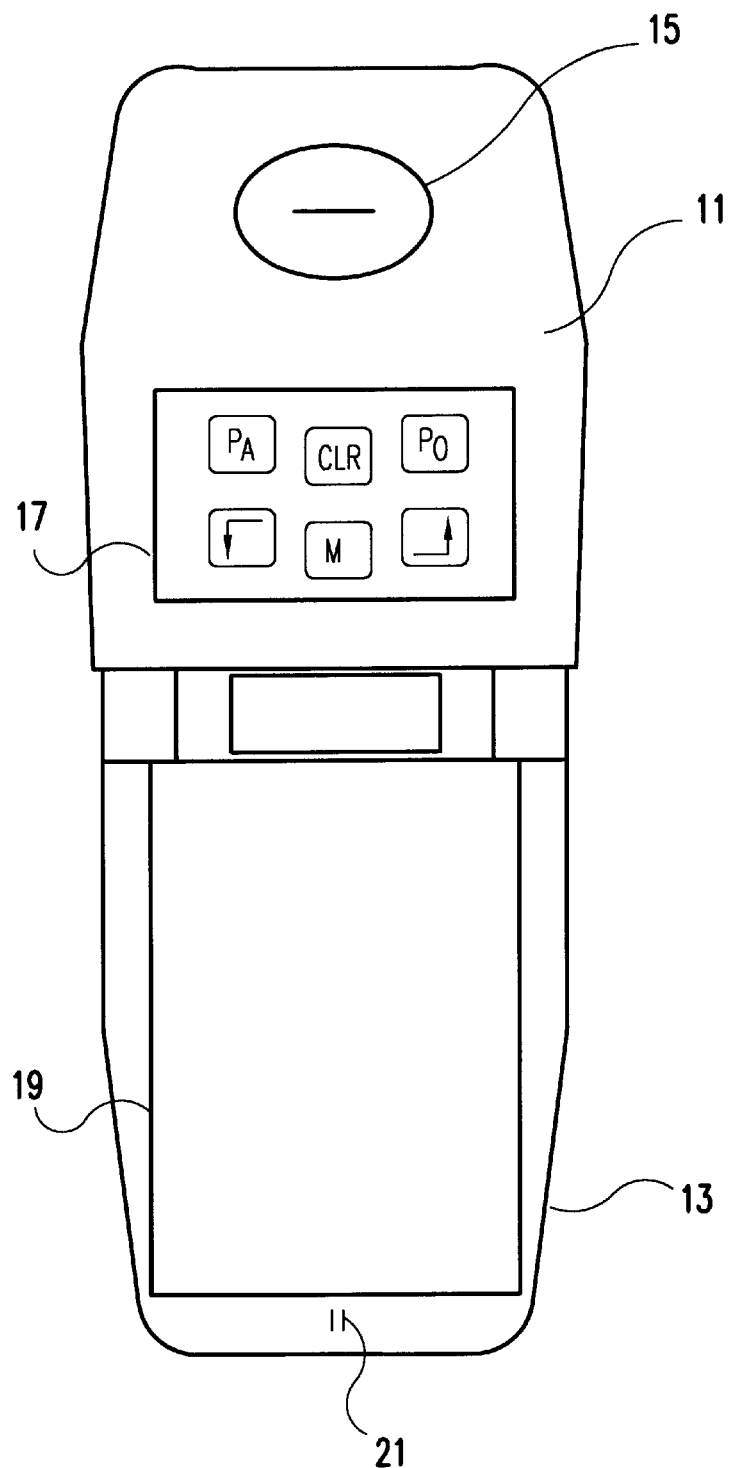
FIG. 2 illustrates the same view of the telephone handset, but showing the display when the handset is operating in the alternate mode to display a large amount of data and with the smaller display screen being used to define a limited functional keypad.

As shown in FIGS. 1 and 2, the cellular phone handset of the present invention comprises two casing sections 11 and 13 which are hinged together to permit the handset to be folded up to make it convenient for carrying in a pocket or handbag. The upper casing section 11 contains a speaker 15 and a touch sensitive display screen 17. The lower casing section 13 contains a touch sensitive display screen 19 and a microphone 21. The display screens 17 and 19 are of the liquid crystal display type. When operating in the telephone dialing mode as shown in FIG. 1, the lower display screen 19 will be controlled to display a keypad comprising a set of 18 keys, each of which will be located over a touch sensitive target on the display screen 19. The lower 12 keys will correspond to the keypad of a conventional telephone and include the conventional alpha-numeric insignia of the conventional telephone keypad. The upper 6 keys will correspond to control functions. When operating in the telephone dialing mode wherein the keypad is displayed as shown in FIG. 1, the user will press one of the function keys to obtain a dial tone and then may dial a selected number by touching the keys of the telephone number to be called. Alternatively, one of the function keys can be used in combination with the digit keys of the telephone keypad to automatically dial numbers stored in the memory of the system. In either case, the dialed number will be displayed on the display screen 17 and in the case of an automatic dialing, the name of the person being dialed may also be displayed. The function keys in addition to initiating a call and enabling automatic dialing would also be used to terminate a call and perform other selected functions such as calling up information from memory to be displayed on the display screen 17, such as a list of the persons or places that can be automatically dialed and the associated keypad digit or digits for effecting the automatic dialing.

The mode of operation represented by FIG. 1 would also be used when it was desired to enter data into the memory of the handset, or to transmit data to a remote location to which a telephone connection has been made, using the telephone keypad displayed on the screen. When entering or transmitting data by means of the telephone keypad, the data entered or transmitted would be displayed on the screen 17.

One of the upper six function keys will be a mode switching key and will bear an appropriate insignia to indicate this function, such as an "M" or the word "MODE". When the MODE switching key is touched by the user, the mode of operation is switched to that represented by FIG. 2 in which the lower display screen 19 becomes an information displaying screen and the upper screen 17 is used to display a set of function keys, which in the preferred embodiment consist of 6 function keys. The keys corresponding to the telephone keypad are not needed in this mode of operation since the handset will not be used in this mode for dialing a number to be called. The user can switch the mode shown in FIG. 2 in the middle of a call or upon receiving a call in order to receive and display a text message from a caller or to receive a map, picture, x-rays or other graphic information sent by the caller. The displayed information may be displayed as it is received by the handset or may have been previously stored and called up for display by the user. The touch sensitive function keys displayed on the upper screen 17 may include functions to control the display, such as keys to scroll up or down, or keys to page up and down. One of the function keys displayed on the screen may also be provided to effect a hang up or disconnect. One of the function keys will be a mode switching key and bear an appropriate insignia, such as an "M" or the word "MODE" to indicate that it has this function. Upon the operator touching the mode switching key, the mode of operation will be then switched back to that shown in FIG. 1 to enable the user of the system to initiate another call by dialing another telephone number by touching the appropriate keys which will then be displayed on the display screen 19, or to use the telephone keypad to enter or transmit data.

Each of the display screens will be provided with two electro-luminescent panels providing backlighting. By using the two panels, the screen can be backlit two ways, one way being to backlight just the keys being displayed on the screen and the other way being to backlight the entire screen. In the preferred embodiment, this backlighting is carried out by one of the panels operating to backlight only the displayed keys and the other panel functioning to backlight the areas outside the keys. When a display screen is operating as a keypad, only the electro-luminescent panel which illuminates only the keys would be energized. When the screen is being used to display information and not operating as a keypad, then both electro-luminescent panels will be energized.

Figure 3:
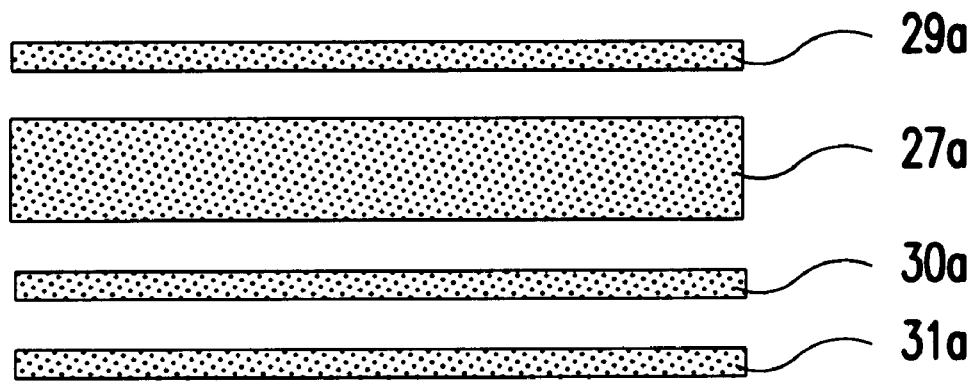
FIG. 3 illustrates a schematic sectional view through one of the display screens illustrating the arrangement of the functional components of the display screen.

FIG. 3 is a schematic exploded sectional view of the display screen 19 showing the arrangement of the components of the display screen. The display screen comprises a liquid crystal display unit 27a on top of which is a touch sensitive overlay 29a. When the display screen is operated in the telephone dialing mode, the liquid crystal display unit 27a will be controlled to display the outline of the keys of the keypad as well as the insignia on each of the keys. An electro-luminescent panel 30a is positioned beneath the liquid crystal display 27a and will operate when energized to backlight the area of the screen outside the keys displayed by the liquid crystal display unit 27a. A second electro-luminescent panel 31a positioned beneath the panel 30a operates to backlight the areas within the key outlines displayed by the liquid crystal display unit 27a. When keys are being displayed on the display screen 19, only the panel 31a will be energized so that only the areas within the displayed key outlines are backlit. When the display screen 19 is operated in an information mode in which it is not displaying keys, then both panels 30a and 31a will be energized to backlight the entire screen. The display screen 17 comprises an identical arrangement of components as the display screen 19, which components are identified as the liquid crystal display unit 27b, a touch sensitive overlay 29b, and electroluminescent panels 30b and 31b, which provide backlighting to the screen 17 in the same manner as the electroluminescent panels 30a and 31a provide backlighting to the screen 19. In this manner, the display screens are controlled to backlight only the displayed keys when such display screen is operating in a keypad mode and to backlight the entire screen when such display screen is operating in an information display mode. In the preferred embodiment, the liquid crystal display units 27a and 27b will display each key by displaying a closed figure defining the outline of the key and insignia within the key to identify the key and/or its function. The liquid crystal closed figure outline can be omitted so that only the backlighting provided by the electroluminscent panel 31a or 31b and the liquid crystal display of key insignia define the target area of each key.

Figure 4:
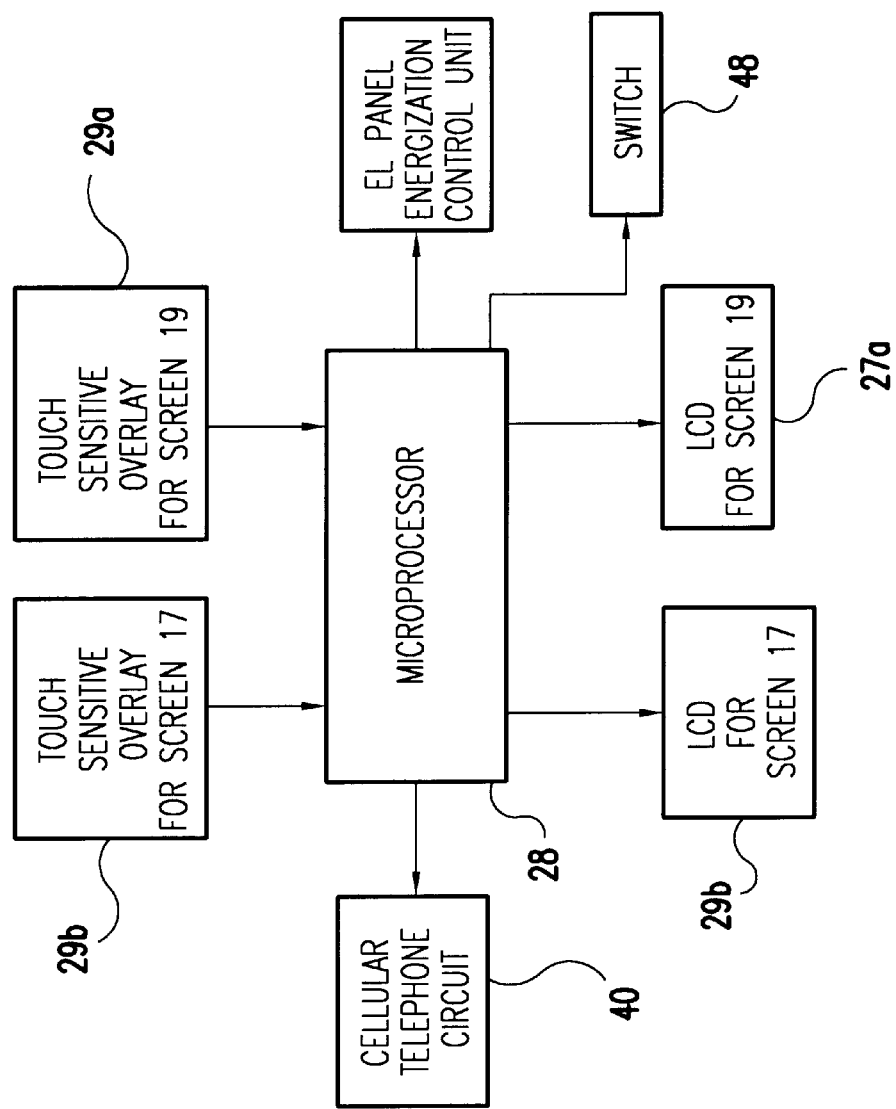
FIG. 4 is a block diagram of the electrical circuit of the handset of the invention.

As shown in FIG. 4, when the handset is operating in a telephone dialing mode, a microprocessor 28 of the handset will control the liquid crystal display unit 27a for the screen 19 to display the telephone keypad on the screen 19 as shown in FIG. 1 and will respond to the touching of the target areas in the touch sensitive overlay 29a corresponding to the displayed keys on the screen 19 to carry out the functions or the dialing directed by the touching of the corresponding displayed keys on the screen 19 by the liquid crystal display unit 27a. The microprocessor 28 controls a cellular telephone circuit 40 to carry out dialing and other cellular telephone functions and receives data transmitted to the telephone circuit 40. When the handset is operating in the information display mode, the microprocessor 28 will control the liquid crystal display unit 29b for the screen 17 to display the function keys on the display screen 17 as shown in FIG. 2 and the microprocessor 28 will respond to the touching of the function keys displayed on the screen 17 to carry out the functions called for by the touching of the function keys.

Figure 5:
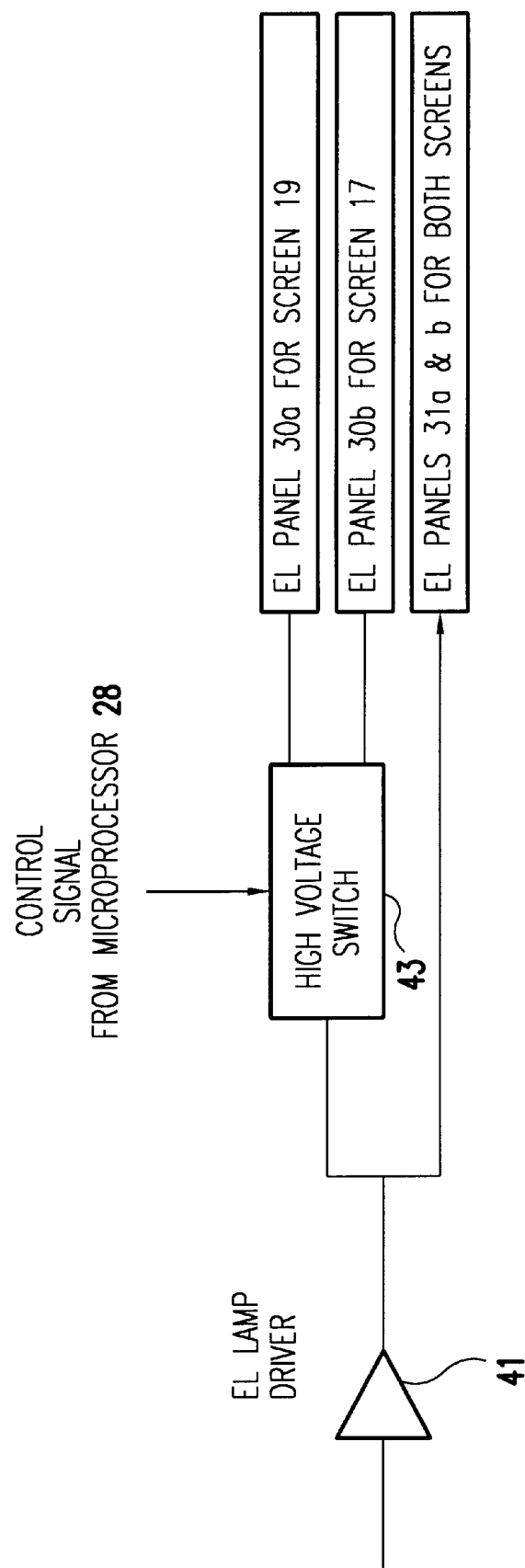
FIG. 5 is a block diagram of a circuit employed to a selectively energize electroluminescent panels employed to backlight the display screens.

As shown in FIG. 5, the circuit for controlling the energization of the electro-luminescent panels comprises an electroluminescent lamp driver 41 which, when the power for the handset is turned on, will apply power to both the electroluminescent panels 31a and 31b continuously to always backlight the areas inside the keys so that this backlighting is provided whether or not the keys are displayed. The power from the electroluminescent lamp driver 41 is also applied to a high voltage switch 43 which is controlled by the microprocessor 28. When the handset is operating in the telephone dialing mode represented in FIG. 1, the high voltage switch 43 will apply the power from the electroluminescent lamp driver 41 to the electroluminescent panel 30b for the screen 17, but not to the electroluminescent panel 30a for the screen 19. As a result, when the handset is operating in the telephone dialing mode illustrated in FIG. 1, both EL panels 30b and 31b for the screen 17 will be energized to backlight the whole screen 17 and in the screen 19, only the electroluminescent panel 31a will be energized so that in the screen 19, only the areas within the displayed keys in the keypad are backlit. When the mode of the handset is switched to operate in the mode shown in FIG. 2, both panels 31a and 31b will still be energized, but in this mode of operation, the electroluminscent panel 30a for the screen 19 will be energized and the electroluminescent panel 30b for the screen 17 will be turned off. As a result, only the area inside the displayed keys on the screen 17 will be backlit and the whole screen 19 will be backlit in this mode of operation.

With the telephone handset as described above, the user is provided with a relatively large screen area to display information without unduly restricting the area for the keypad use for dialing a number for outgoing calls.

The preferred embodiment of the invention is a cellular telephone handset of the folding type in which there is a need to limit the size of the screen area for displaying information. The inventive concept, however, may also be employed in conventional directly connected telephones as well as in cordless telephone handsets. These and many other modifications may be made to the above-described specific embodiments without departing from the spirit and scope of the invention, which is defined in the appended claims.

I claim:

1. A telephone handset comprising a first display screen, a second display screen, a first touch sensitive overlay on said first screen, a second touch sensitive overlay on said second display screen, data processing means operating in the first mode to display a keypad including a telephone keypad comprising a plurality of keys on said first display screen, to display information on said second screen, and to make a telephone call in response to the touching of the displayed keys of said telephone keypad, and operating in a second mode to display a keypad including a set of keys on said second screen, to display information on said first screen and responsive to the touching of the keys of said second set to control the display of information on said first screen, said data processing means including means to switch the mode of said data processing means to said first mode or to said second mode.

2. A telephone handset as recited in claim 1, wherein said first set of keys includes a mode switching key and said second set of keys includes a mode switching key, said data processing means being responsive in said first mode to the touching of the mode switching key of said first set to switch said data processing means to said second mode and being responsive in said second mode to the touching of the mode switching key of said second set to switch said data processing means to said first mode.

3. A telephone handset as recited in claim 1, wherein said handset comprises a first case and a second case hinged to said first case to permit said cases to fold together, said first screen being on said first case and said second screen being on said second case.

4. A telephone handset as recited in claim 3, wherein said handset comprises a cellular telephone handset.

5. A telephone handset as recited in claim 1, wherein each of said screens includes a liquid crystal display to display said keypads and to display information, and means to backlight said display screens.

6. A telephone handset as recited in claim 5 wherein said means to backlight said screens operates to backlight only the target areas of displayed keys on the one of said screens on which keys are displayed and backlight the entire other one space.

7. A telephone handset as recited in claim 6, wherein said means to backlight said screens comprises a first and second electroluminescent panel for said first screen and a first and second electroluminescent panel for said second screen, said first electroluminescent panels backlighting the areas of said keys and said second electroluminescent panels backlighting the areas outside of said keys and means to energize only said first electroluminescent panel for each screen when keys are displayed on such screen and to energize both said panels for a screen when keys are displayed on the other one of said screens.

8. A telephone handset as recited in claim 1, wherein said handset comprises a cellular telephone handset.

* * * * *